United States Patent [19]

Balducci et al.

[11] Patent Number: 5,485,648
[45] Date of Patent: Jan. 23, 1996

[54] COVERING FOR THE PARTIALLY COATING OF ARTICLES SUCH AS BROOM BACKS AND ARTICLES SUCH AS BROOM BACKS SO COVERED

[75] Inventors: Sergio Balducci, 590 Via Fiorentiana, 50132 Bottegone (Pistoia), Italy; Roberto Giraldi, Prato, Italy

[73] Assignee: Sergio Balducci, Via Fiorentina, Italy

[21] Appl. No.: 175,402

[22] Filed: Jun. 16, 1994

[30] Foreign Application Priority Data

Jul. 9, 1991 [IT] Italy .................. FI91A0171

[51] Int. Cl.⁶ .................................. A46B 5/00
[52] U.S. Cl. .................. 15/175; 15/159.1; 15/171; 156/212; 156/285; 427/294
[58] Field of Search .................. 15/159.1, 171, 15/175; 156/212, 285; 300/21; 427/294–297

[56] References Cited

U.S. PATENT DOCUMENTS

| 2,989,767 | 6/1961 | Charvat | 300/21 |
| 3,524,210 | 8/1970 | McLean | 15/175 |
| 3,576,049 | 4/1971 | Williams | 15/175 |

FOREIGN PATENT DOCUMENTS

| 0251546 | 1/1988 | European Pat. Off. | |
| 0302703 | 2/1989 | European Pat. Off. | |
| 1057566 | 5/1959 | Germany | 15/171 |
| 15589 | 7/1896 | United Kingdom | 15/175 |
| 90-06224 | 6/1990 | WIPO | |
| 91-06420 | 5/1991 | WIPO | |

*Primary Examiner*—Mark Spisich
*Attorney, Agent, or Firm*—Browdy and Neimark

[57] ABSTRACT

An article such as a broom back coated with a covering comprising a layer (9) of thermoformable plastic material. The broom backs (1) are introduced in a chamber (6) of a thermoforming machine (5) radiating panel (8). A plate of thermoformable material is put on the broom backs (1) and by the action of the heat radiated by the panel (8) and under vacuum condition the plate melts forming a layer (9) which wraps the broom backs (1) almost completely. The coating layer (9) thus formed after deformation maintains its colour and brightness and inscriptions and fancy drawings can also be preprinted on it. The covering formed by said layer (9) comprises an upper and a side surface completely wrapping the upper and the side faces of broom backs (1) and a lower bent edge partially coating the lower face (2a) thereof. The layer (9), which preferably is of PVC or polystyrene, advantageously preprinted, is firmly secured to the broom backs (1) after cooling.

4 Claims, 1 Drawing Sheet

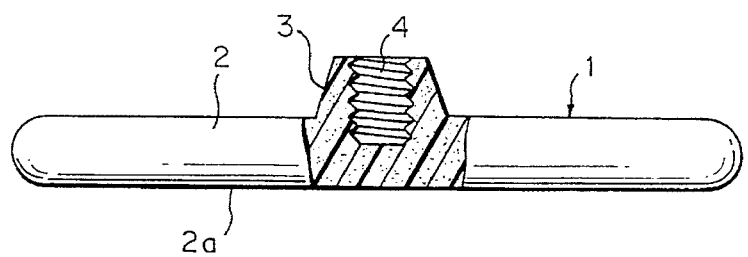
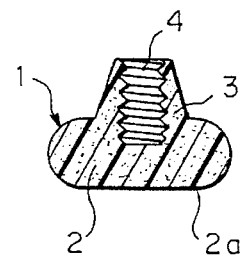
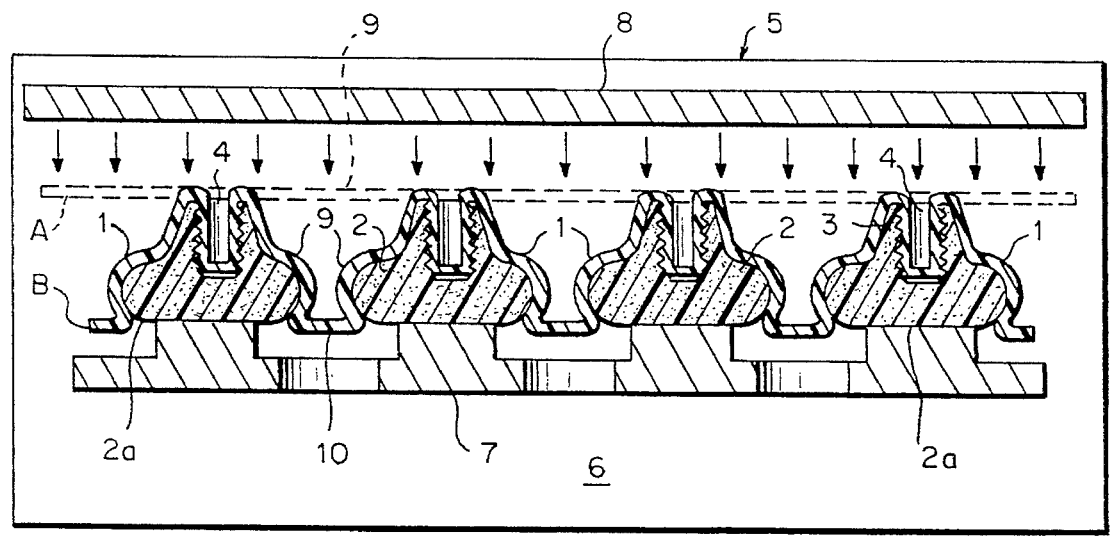
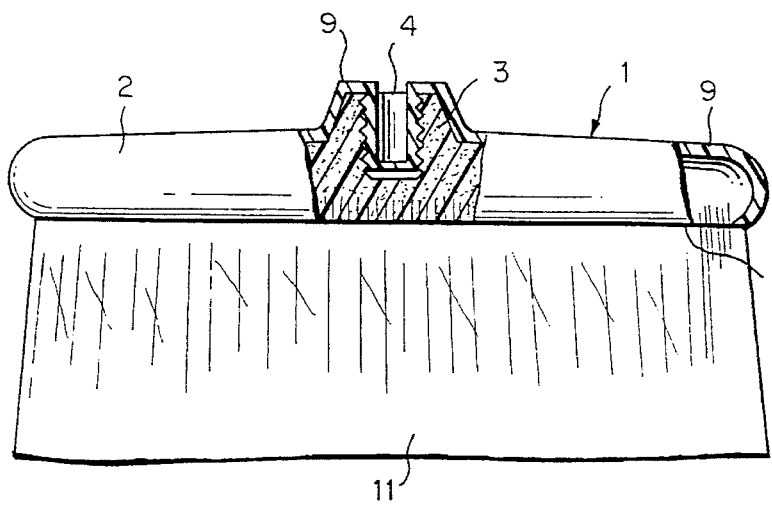
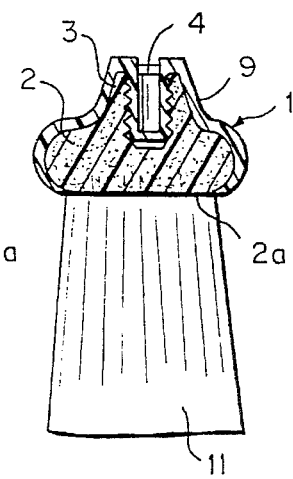

1

COVERING FOR THE PARTIALLY COATING OF ARTICLES SUCH AS BROOM BACKS AND ARTICLES SUCH AS BROOM BACKS SO COVERED

FIELD OF THE INVENTION

The present invention is generally related to the field of the plastic materials processing and more precisely it relates to a covering for the partially coating of articles such as broom backs and to articles such as broom backs so covered.

DESCRIPTION OF THE PRIOR ART

In the production of articles made either of plastic or other material much attention is paid to both mechanical features, such as lightness and strength, and aesthetic features, such as the degree of surface finishing, brightness, coulour and presence of drawings and/or decorations on the article surface. Very often, however, materials with excellent mechanical features do not exhibit so good aesthetic features. In these cases the articles are coated with films or layers of material of a different type and more satisfactory from the aesthetic point of view.

Among the articles for which mechanical and aesthetic qualities are an essential requirement, there are in particular the backs of brooms. A broom back substantially consists of an elongated body made of wood or plastic to a face of which cleaning bristles are set, while to the other face a threaded support is formed for engagement with the end of a long handle. In order to save the production costs and to make easier the application of the cleaning bristles, the back is generally made of plastic material such as polypropylene both of the compact and the foam type. In the first case the back is heavier, but exhibits a satisfactory surface finishing, while in the second case, which is the less expensive one, the back is lighter but the surface finishing is very poor. In both cases, the backs made of these materials and of similar materials are covered by applying plastic masks produced separately and snap fitted to them. The mask covering system is expensive because two moulds are necessary one for the back and one for the mask. The backs made of foam polypropylene may also be painted; however, to allow the painting to adhere to the surface, a preliminary treatment with a solvent must be carried out, thereby the production cost is further increased.

As another type of covering of objects having whichever shape, as disclosed in European Patent Application 0302703, there is known a film of conformable material which can be wrapped to a surface of the objects under heating and vacuum conditions. This film is able to cover a single face of the objects, though having complex shape with recesses and projections, but it is unable to cover in a satisfactory way broom backs, whose side faces are frequently subjected to impacts against walls, furniture, etc. Actually the free edge of the film, though glued or fixed under pression to the side surfaces of a broom back or the like, would rapidly tend to break off the side faces with use.

It is an object of the present invention to provide a covering for the partially coating of articles, such as broom backs, which is unexpensive and easy to exploit, and capable of produce a high surface finishing and brightness coating with the possibility of obtaining decorations and fancy drawings on it even in different colours.

Another object of the invention is to provide articles such as backs for brooms having the above mentioned features.

SUMMARY OF THE INVENTION

The above objects are reached with the covering according to the invention for the partially coating of articles such as broom backs with a layer of plastic material, characterized in that said layer comprises an upper and a side surface completely wrapping the upper and the side faces of a broom back and a lower cut bent edge partially coating also the lower face thereof.

Further characteristics and advantages of the covering and the broom backs according to the invention will be clearer with the following description of a non limiting, exemplifying embodiment, with reference to the attached drawings.

BRIEF DESCRIPTION OF THE DRAWINGS

In the drawings:

FIGS. 1 and 2 show respectively a longitudinal and a transverse sectional view of an article such as a back of a broom to be coated by a covering according to the invention;

FIG. 3 shows coating steps of broom backs by coverings according to the invention;

FIGS. 4 and 5 show respectively a longitudinal and a transverse sectional view of an article such as a back of a broom as coated by a covering according to the invention.

DESCRIPTION OF THE PREFERRED EMBODIMENT

With reference to FIGS. 1 and 2, an article 1 such as a brush block, in the present case a back of a broom, has a base 2 and a support 3 in which a threaded seat 4 is formed for accomodating the end of a long handle, not shown. The back 1 does not exhibit a satisfactory surface finishing because it is made with material shaving excellent mechanical features, such as compact or semifoam polypropylene, but having poor aesthetic qualities.

With reference to FIG. 3, a thermoforming machine of conventional type, diagrammatically shown and indicated at 5, comprises an internal chamber 6 suitable of being placed under vacuum by known means, a supporting plane 7 and a heat radiating panel 8.

In order to carry out the coating of the backs 1 providing them with a covering according to the invention it is necessary to arrange them on the supporting plane 7 of the machine 5 and put on them a plate 9 of plastic material; afterwards, it is necessary to place the chamber 6 under vacuum condition and make the panel 8 to radiate heat. The plate 9 of plastic material, for example polystyrene or PVC, has the characteristic of being thermoformable and due to the heating operated by panel 8 and the vacuum condition in the chamber 6, passes from a plane configuration indicated at A and shown with a dashed line, to a deformed configuration, indicated at B, forming a covering according to the invention comprising a layer 9 completely wrapping the base 2, the support 3 and the internal walls of the seat 4 of the backs 1 with the exception of the lower face 2a of said backs, which is only partially wrapped by a bent edge. The layer 9 has almost completely coated the backs 1 and, after it has been cooled or, alternatively, after panel 8 has discontinued the heat radiation and chamber 6 has been opened, holds the backs 1 secured together through layer portions 10. Portions 10 can be partially removed by cutting with known means, the remaining portion thereof forming said bent edges partly coating faces 2a. As said bent edges do not lay on the side faces of the broom backs, which are subjected to frequent impacts against walls, furniture etc., there is no danger of breaking off the layer 9 with use.

With reference to FIGS. 4 and 5, the back as produced is completely coated except face 2a which is only partially coated and to which a plurality of cleaning bristles 11 is applied according to known processes such as hot injection. The layer 9 forming the covering according to the invention and coating back 1 is of a material such that an excellent surface quality and brightness is preserved even after thermoforming has been carried out as described above.

The layer 9 can be of any colour and inscriptions and/or fancy drawings of any type can be preprinted on it obtaining particularly desirable backs of brooms that, up to now, have been produced in only one colour and with a surface finishing less acceptable from an aesthetic point of view.

Besides polystyrene and PVC the layer 9 can be made of any other thermoformable plastic material capable of maintaining excellent brightness and surface finishing after heating and under vacuum deformation.

Variations and/or modifications may be brought to the covering according to the invention and to articles such as broom backs covered by it without departing from the scope of the invention as defined in the appended claims.

We claim:

1. A broom head comprising:

(a) an elongated broom back having an upper face, a lower face with plurality of bristles projecting therefrom and side faces extending between the upper and lower faces; a support extending from a central portion of the upper face, said support having a threaded seat therein for enabling attachment of the broom back to a handle, said threaded seat being defined by a side wall extending about its periphery and a closed end wall spaced from said lower face; and (b) a layer of thermoformed plastic material completely covering, closely engaging and conforming to the upper face, side faces, the support and the side wall and end wall of the threaded seat, said plastic layer further having a lower cut bent edge partially covering the lower face.

2. The broom back according to claim 1, wherein said layer of plastic material is PVC.

3. The broom back according to claim 1, wherein said layer of plastic material is polystyrene.

4. The broom back according to claim 1, wherein said layer has preprinted colors and inscriptions thereon.

\* \* \* \* \*

UNITED STATES PATENT AND TRADEMARK OFFICE
CERTIFICATE OF CORRECTION

PATENT NO. : 5,485,648
DATED : January 23, 1996
INVENTOR(S) : Balducci, et. al.

It is certified that error appears in the above-indentified patent and that said Letters Patent is hereby corrected as shown below:

Cover page, line [22], delete "Filed: Jun. 16, 1994" and insert therefor --PCT Filed: July 9, 1992--;

Cover page, insert the following after line [22]:

--[86] PCT NO.: PCT/IT92/0078
§371 Date: Jun. 16, 1994
§102(e) Date: Jun. 16, 1994

[87] PCT Pub. No.: WO93/01042
PCT Pub. Date: Jan. 21, 1993--

Column 2, line 36, delete "material shaving" and insert therefor --materials having--.

Signed and Sealed this

Eleventh Day of February, 1997

Attest:

BRUCE LEHMAN

Attesting Officer     Commissioner of Patents and Trademarks